US012643812B2

(12) United States Patent
Ishikawa et al.

(10) Patent No.: US 12,643,812 B2
(45) Date of Patent: ***Jun. 2, 2026

(54) METHOD FOR PRODUCING FLUORINE-CONTAINING SILICA GLASS

(71) Applicant: SUMITOMO ELECTRIC INDUSTRIES, LTD., Osaka (JP)

(72) Inventors: Shinji Ishikawa, Osaka (JP); Tetsuya Haruna, Osaka (JP); Keisei Morita, Osaka (JP); Tatsuro Hasegawa, Osaka (JP); Seiji Arakawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 344 days.

This patent is subject to a terminal disclaimer.

(21) Appl. No.: 18/013,201

(22) PCT Filed: Sep. 27, 2021

(86) PCT No.: PCT/JP2021/035328
§ 371 (c)(1),
(2) Date: Dec. 27, 2022

(87) PCT Pub. No.: WO2022/065474
PCT Pub. Date: Mar. 31, 2022

(65) Prior Publication Data
US 2023/0339797 A1 Oct. 26, 2023

(30) Foreign Application Priority Data
Sep. 28, 2020 (JP) ................................ 2020-162357

(51) Int. Cl.
*C03B 37/014* (2006.01)
(52) U.S. Cl.
CPC .... *C03B 37/01453* (2013.01); *C03B 2201/12* (2013.01)

(58) Field of Classification Search
None
See application file for complete search history.

(56) References Cited

U.S. PATENT DOCUMENTS

| | | | |
|---|---|---|---|
| 4,586,943 A | 5/1986 | Kyoto et al. | |
| 5,053,068 A | 10/1991 | Kyoto et al. | |

(Continued)

FOREIGN PATENT DOCUMENTS

| | | | | |
|---|---|---|---|---|
| CN | 112266162 A | * | 1/2021 | ........... C03B 37/014 |
| JP | S56-063833 A | | 5/1981 | |

(Continued)

OTHER PUBLICATIONS

JP2007076927A Clarivate Analytics Machine Translation retrieved Jan. 23, 2025. (Year: 2025).*

(Continued)

*Primary Examiner* — Lisa L Herring
(74) *Attorney, Agent, or Firm* — Faegre Drinker Biddle & Reath LLP

(57) ABSTRACT

A method for producing fluorine-containing silica glass is disclosed. The method includes decompression degassing which includes degassing an inside of a furnace core tube under reduced pressure while heating the inside of the furnace core tube, after inserting a porous silica glass body into the furnace core tube provided in an airtight container; fluorine adding which includes supplying a fluorine compound gas into the furnace core tube, exhausting the fluorine compound gas remaining in the furnace core tube to an outside of the furnace core tube, and first heat-treating the porous silica glass body, under reduced pressure; and second heat-treating the porous silica glass body under reduced pressure at a temperature higher than temperatures in the decompression degassing process and the fluorine adding process.

6 Claims, 7 Drawing Sheets

(56) References Cited

U.S. PATENT DOCUMENTS

| | | | |
|---|---|---|---|
| 5,145,507 A | 9/1992 | Kyoto et al. | |
| 5,158,587 A | 10/1992 | Kyoto et al. | |
| 5,203,899 A | 4/1993 | Kyoto et al. | |
| 5,330,548 A * | 7/1994 | Danzuka | C03B 37/01446 |
| | | | 65/427 |
| 5,364,428 A | 11/1994 | Kyoto et al. | |
| 5,713,979 A * | 2/1998 | Nicholson | C03B 37/0146 |
| | | | 65/540 |
| 2006/0115913 A1 | 6/2006 | Orita et al. | |
| 2012/0118018 A1 | 5/2012 | Orita et al. | |
| 2014/0050450 A1 | 2/2014 | Orita et al. | |
| 2015/0259238 A1 | 9/2015 | Trommer et al. | |
| 2017/0362115 A1* | 12/2017 | Dawes | G02B 6/036 |

FOREIGN PATENT DOCUMENTS

| | | | |
|---|---|---|---|
| JP | S60-090842 A | 5/1985 | |
| JP | S61-215224 A | 9/1986 | |
| JP | S61-247633 A | 11/1986 | |
| JP | S62-083331 A | 4/1987 | |
| JP | S62-153130 A | 7/1987 | |
| JP | H01-219034 A | 9/1989 | |
| JP | H01-275441 A | 11/1989 | |
| JP | 2006-193409 A | 7/2006 | |
| JP | 2007076927 A * | 3/2007 | C03B 37/0146 |
| JP | 2008-050202 A | 3/2008 | |
| JP | 2009-154090 A | 7/2009 | |
| JP | 2016-028992 A | 3/2016 | |

OTHER PUBLICATIONS

CN-112266162-A EPO Machine Translation retrieved Sep. 24, 2025. (Year: 2025).*

* cited by examiner

METHOD FOR PRODUCING FLUORINE-CONTAINING SILICA GLASS

TECHNICAL FIELD

The present disclosure relates to a method for producing fluorine-containing silica glass. The present application claims priority from Japanese Patent Application No. 2020-162357 filed on Sep. 28, 2020, the entire content of which is incorporated herein by reference.

BACKGROUND ART

PTLs 1 to 3 disclose methods for adding fluorine to a glass preform by exposing the glass preform to an atmosphere containing a fluorine compound gas and an inert gas such as He, and then consolidating the glass preform to make the glass preform transparent. As disclosed in PTL 3, in such a method for producing fluorine-containing silica glass in related art, each step is performed by setting pressure in a production apparatus to 1 atm or more.

PTL 4 discloses that a dehydration reaction of a glass fine particle aggregate is promoted by exposing the glass fine particle aggregate to an inert gas atmosphere containing halogen in a heating furnace in which pressure can be reduced to 0.1 torr or less. PTL 5 discloses a method for heating a glass preform while blowing a halogen gas such as chlorine under reduced pressure to make the glass preform transparent. PTL 6 describes a method for producing transparent glass, including a step of removing OH contained in a glass fine particle deposit by supplying a CO-containing gas in a heating furnace that can be vacuum deaerated, and then removing CO on a surface of the glass fine particle deposit under reduced pressure.

CITATION LIST

Patent Literature

PTL 1: JPS60-90842A
PTL 2: JPS62-153130A
PTL 3: JPS61-247633A
PTL 4: JPS56-63833A
PTL 5: JPH1-275441A
PTL 6: JP2008-50202A

SUMMARY OF INVENTION

A method for producing fluorine-containing silica glass according to an aspect of the present disclosure includes:
  a degasification step of degassing an inside of a furnace core tube under reduced pressure while heating the inside of the furnace core tube, after inserting a porous silica glass body into the furnace core tube provided in an airtight container;
  a fluorine addition step of supplying a fluorine compound gas into the furnace core tube and heat-treating the porous silica glass body, under reduced pressure; and
  a transparent vitrification step of heat-treating the porous silica glass body under reduced pressure at a temperature higher than temperatures in the degasification step and the fluorine addition step.

DESCRIPTION OF EMBODIMENTS

Figure 1:
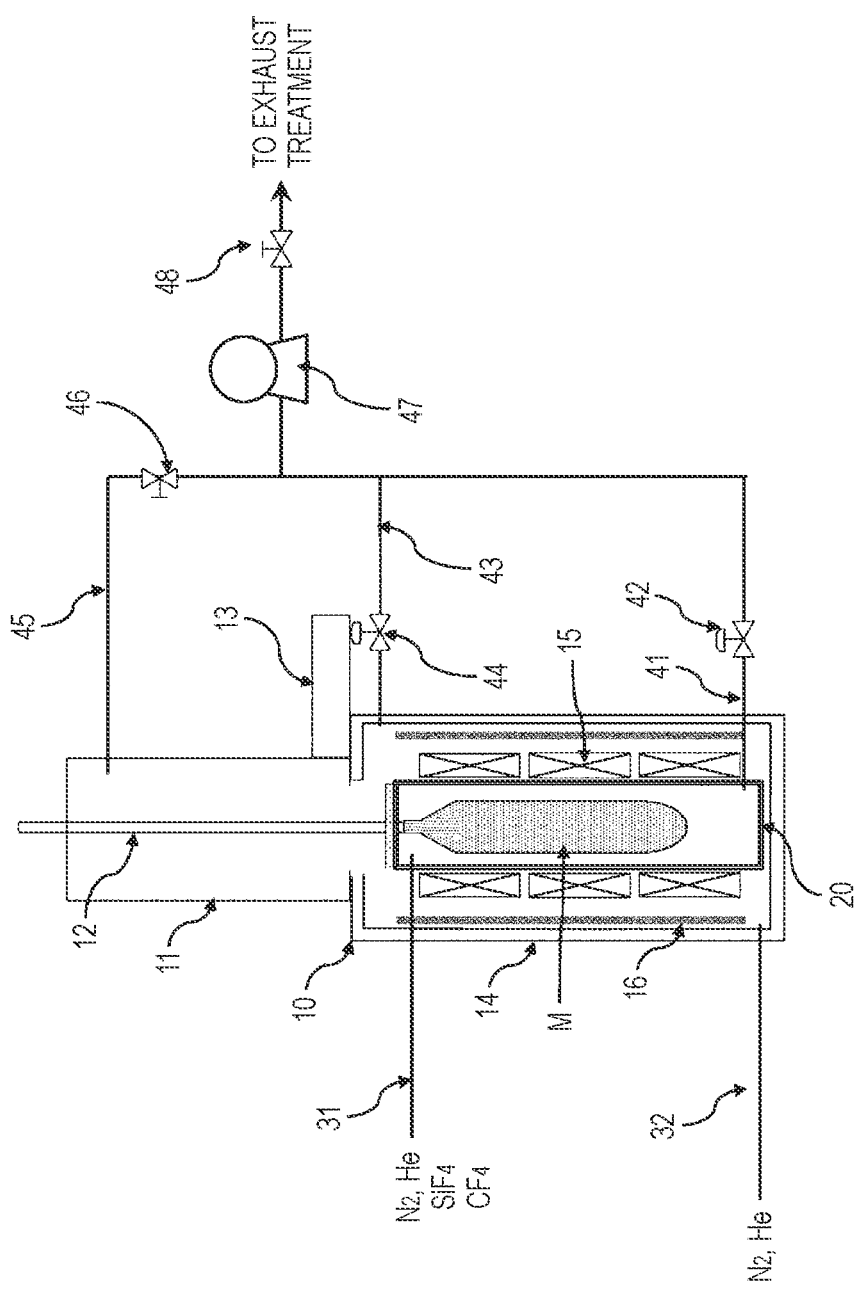
FIG. 1 is a schematic view showing an example of a production apparatus of fluorine-containing silica glass.

Problems to be Solved by Present Disclosure

In the methods disclosed in PTLs 1 to 3, as a size of a porous silica glass body (glass preform) increases, a time required for adding fluorine increases, and usage amounts of the fluorine compound gas and the inert gas also significantly increase. In particular, when He is used as the inert gas, an increase in a production cost due to the increase in the usage amount of the inert gas becomes a serious problem.

As in the methods disclosed in PTLs 4 to 6, when the dehydration reaction or transparent vitrification is performed in a vacuum container, usage amounts of an inert gas and the like in these steps can be reduced. However, PTLs 4 to 6 do not disclose a technique of adding fluorine to a porous silica glass body in the vacuum container, and do not disclose, for example, any condition for preventing deterioration of the vacuum container due to a fluorine compound and stably using the vacuum container for a long period of time.

An object of the present disclosure is to produce fluorine-containing silica glass with high productivity while preventing deterioration of a container used for production and reducing a usage amount of an inert gas.

Effects of Present Disclosure

According to a configuration of the disclosure described above, fluorine-containing silica glass can be produced with high productivity while preventing deterioration of a container used for production and reducing a usage amount of an inert gas.

Description of Embodiments of Present Disclosure

First, embodiments of the present disclosure will be listed and described.

A method for producing fluorine-containing silica glass according to an aspect of the present disclosure includes:
  a degasification step of degassing an inside of a furnace core tube under reduced pressure while heating the inside of the furnace core tube, after inserting a porous silica glass body into the furnace core tube provided in an airtight container;

a fluorine addition step of supplying a fluorine compound gas into the furnace core tube and heat-treating the porous silica glass body, under reduced pressure; and a transparent vitrification step of heat-treating the porous silica glass body under reduced pressure at a temperature higher than temperatures in the degasification step and the fluorine addition step.

According to a configuration, the fluorine-containing silica glass can be produced with high productivity while preventing deterioration of a container used for production and reducing a usage amount of an inert gas. Specifically, since moisture and an OH group in the porous silica glass body which reacts with the fluorine compound gas to generate an HF gas are desorbed in the degasification step before the fluorine addition step, the deterioration of the container can be prevented. Since the fluorine compound gas easily permeates into the porous silica glass body under reduced pressure, an addition rate of a fluorine compound is improved, and productivity is increased. Furthermore, since each of the above steps is performed under reduced pressure, it is not necessary to use the inert gas, and even if the inert gas is used, the usage amount of the inert gas can be reduced.

The term "under reduced pressure" refers to a state in which pressure in the furnace core tube is lower than atmospheric pressure. The temperatures of the degasification step and the fluorine addition step indicate a temperature of the furnace core tube surface in each of the steps.

In the production method, the degasification step is preferably performed at a temperature of 600° C. or more and 1200° C. or less.

According to this configuration, since the degasification step is performed at a temperature of 600° C. or more, the desorption of the OH group present as a silanol group can be further promoted. Since the degasification step is performed at a temperature of 1200° C. or less, a situation in which consolidation of the porous silica glass body proceeds and density increases is unlikely to occur. As a result, a situation in which the fluorine compound gas is difficult to permeate into the porous silica glass body in the fluorine addition step can be prevented.

In the production method, a maximum temperature in the degasification step is preferably 900° C. or more and 1200° C. or less.

According to this configuration, since a desorption reaction of the moisture and the OH group proceeds faster as the temperature is higher, the moisture and the OH group in the porous silica glass body can be efficiently desorbed.

In the production method, the degasification step preferably has a heating time of at least 30 minutes at the maximum temperature.

According to this configuration, the moisture and the OH group in the porous silica glass body can be more efficiently desorbed.

In the production method, an ultimate pressure at an end of the degasification step is preferably less than 500 pascals.

According to this configuration, since the degasification step is performed under sufficiently low pressure, the moisture and the OH group in the porous silica glass body can be more efficiently desorbed.

The term "pressure" used herein refers to the pressure in the furnace core tube.

In the production method, in the degasification step, an inert gas may be supplied into the furnace core tube.

According to this configuration, an impurity such as the moisture desorbed from the porous silica glass body can be efficiently exhausted to an outside of the furnace core tube.

In the production method, the fluorine compound gas used in the fluorine addition step is a compound gas of a group 14 element and fluorine, and preferably does not contain a chlorine atom or a hydrogen atom.

According to this configuration, corrosion of a metal component of the container when the fluorine compound gas leaks out of the furnace core tube can be further reduced.

In the production method, in the fluorine addition step, the fluorine compound gas may be diluted with an inert gas at a concentration of 1% or more and less than 100% and supplied, or the fluorine compound gas may be supplied at a concentration of 100%.

According to this configuration, the pressure in the furnace core tube can be easily controlled by adjusting the concentration of the fluorine compound gas.

In the production method, in the fluorine addition step, the heat-treating is preferably performed after stopping exhaustion of the furnace core tube.

According to this configuration, the fluorine compound gas is efficiently permeated into the porous silica glass body and a yield of the fluorine compound gas is improved.

In the production method, in the transparent vitrification step, it is preferable to further perform an evacuation treatment in which pressure is reduced while supplying an inert gas into the furnace core tube.

According to this configuration, the fluorine compound gas remaining in the furnace core tube or the container can be efficiently exhausted, and adsorption of the impurity into the furnace core tube or the container can be prevented.

In the production method, at an end of the transparent vitrification step, an ultimate pressure is preferably less than 500 pascals.

According to this configuration, for example, residual air bubbles in the fluorine-containing silica glass obtained by making the fluorine-containing silica glass transparent are reduced.

Details of Embodiments of Present Disclosure

Hereinafter, an example of an embodiment of a method for producing fluorine-containing silica glass according to the present disclosure will be described with reference to the drawings. In the present specification, directions such as an upper side and a lower side may be referred to, but these directions are relative directions set for convenience of a description.

(Production Apparatus of Fluorine-Containing Silica Glass)

FIG. 1 is a schematic view showing an example of a production of apparatus of the fluorine-containing silica glass. A production apparatus 1 shown in FIG. 1 includes a container 10, a furnace core tube 20, a furnace core tube gas supply portion 31, a furnace body gas supply portion 32, a furnace core tube exhaust pipe 41, a furnace core tube exhaust valve 42, a furnace body exhaust pipe 43, a furnace body exhaust valve 44, a front chamber exhaust pipe 45, a front chamber exhaust valve 46, a vacuum pump 47, and an exhaust valve 48.

The container 10 is an airtight container. The container 10 includes a front chamber 11, a rod 12, a gate valve 13, a furnace body 14, a heater 15, and a heat insulating material 16. The furnace core tube 20 is disposed inside the furnace body 14.

An insertion hole through which the rod 12 is inserted is provided in an upper end portion of the front chamber 11. The rod 12 is inserted into the front chamber 11 through the insertion hole. An upper lid of the furnace core tube 20 is engaged with a lower end portion of the rod 12, and a porous silica glass body M is held on a further lower side thereof. The rod 12 is connected to a lifting device (not shown) and can be lifted and lowered, for example, on a central axis of the furnace core tube 20.

The front chamber 11 and the furnace body 14 are made of, for example, a metal such as steel use stainless (SUS). When the production apparatus 1 is not in use, an opening between the front chamber 11 and the furnace body 14 is closed by the gate valve 13. When the production apparatus 1 is in use, the gate valve 13 is opened to form the opening between the front chamber 11 and the furnace body 14. Further, the porous silica glass body M held by the rod 12 in the front chamber 11 descends and is inserted into the furnace core tube 20 in the furnace body 14.

The heater 15 is disposed around the furnace core tube 20. The heater 15 is, for example, a resistance heating type heater. The heat insulating material 16 is disposed between the heater 15 and the furnace body 14.

The furnace core tube 20 has an opening on an upper side. The opening is closed by the upper lid engaged with the rod 12 when the porous silica glass body M is inserted into the furnace core tube 20. The furnace core tube 20 is in an airtight state when the opening of the furnace core tube 20 is closed by the upper lid. The furnace core tube 20 is preferably made of carbon, for example, from the viewpoint of preventing deformation during high-temperature heating. In order to improve airtightness of the furnace core tube 20, it is also preferable to apply an airtight coating (for example, pyrolytic carbon, glassy carbon, silicon carbide, silicon nitride, or the like) to a surface of a material of the furnace core tube 20.

The furnace core tube gas supply portion 31 supplies a fluorine compound gas (for example, $CF_4$ and $SiF_4$) or an inert gas (for example, $N_2$ and He) into the furnace core tube 20. The furnace body gas supply portion 32 supplies the inert gas into the furnace body 14. By controlling gas supply amounts from the furnace core tube gas supply portion 31 and the furnace body gas supply portion 32, pressure inside the furnace core tube 20 is controlled and exhaustion of unnecessary components and the like to the furnace core tube exhaust pipe 41 and the furnace body exhaust pipe 43 is controlled.

The furnace core tube exhaust pipe 41 is a pipe for exhausting an inside of the furnace core tube 20. The furnace body exhaust pipe 43 is a pipe for exhausting an inside of the furnace body 14. The furnace core tube exhaust pipe 41 is provided with the furnace core tube exhaust valve 42. The furnace body exhaust pipe 43 is provided with the furnace body exhaust valve 44. Exhaust in the furnace body 14 and the furnace core tube 20 is also controlled by these valves. The front chamber exhaust pipe 45 is a pipe for exhausting an inside of the front chamber 11. The front chamber exhaust pipe 45 is provided with the front chamber exhaust valve 46. Exhaust in the front chamber 11 is controlled by the front chamber exhaust valve 46.

The furnace core tube exhaust pipe 41, the furnace body exhaust pipe 43, and the front chamber exhaust pipe 45 merge at a downstream side. The vacuum pump 47 and the exhaust valve 48 are provided in a pipe downstream of a merging point of these exhaust pipes. The vacuum pump 47 is a pump that exhausts and depressurizes the inside of the furnace body 14, the inside of the furnace core tube 20, and the inside of the front chamber 11. The exhaust valve 48 is opened when exhaustion is performed. An exhaust treatment is performed downstream of the exhaust valve 48.

When the fluorine compound gas is contained in an exhaust gas, for example, the exhaust gas is sent to a cleaning tower. When the fluorine compound gas is not contained in the exhaust gas, for example, the exhaust gas is released into an atmosphere. The exhaust gas from the front chamber 11 is released into, for example, the atmosphere. A destination of the exhaust gas is controlled by, for example, an opening/closing valve (not shown) provided downstream of the vacuum pump 47.

In the production apparatus 1, although the furnace core tube 20 has the airtightness, since it is difficult to make the furnace core tube 20 completely airtight, a part of the gas supplied into the furnace core tube 20 may flow into the furnace body 14.

(Method for Producing Fluorine-Containing Silica Glass)

Hereinafter, a method for producing fluorine-containing silica glass according to the present embodiment will be described. In the production method according to the present embodiment, the fluorine-containing silica glass is produced using the production apparatus 1 described above.

The method for producing fluorine-containing silica glass according to the present embodiment includes:

(1) a degasification step (decompression degassing) of degassing the inside of the furnace core tube 20 under reduced pressure while heating the inside of the furnace core tube 20, after inserting the porous silica glass body M into the furnace core tube 20 provided in the airtight container 10;

(2) a fluorine addition step (fluorine adding) of supplying the fluorine compound gas into the furnace core tube 20 and heat-treating (first heat-treating) the porous silica glass body M, under reduced pressure; and (3) a transparent vitrification step (second heat-treating) of heat-treating the porous silica glass body M under reduced pressure at a temperature higher than temperatures in the degasification step and the fluorine addition step.

In the transparent vitrification step, prior to the heat-treating for transparently vitrifying the porous silica glass body M, an evacuation treatment may be performed in which pressure is reduced while supplying the inert gas into the furnace core tube 20.

The porous silica glass body M can be produced, for example, by a known method such as a vapor-phase axial deposition (VAD) method or an outside vapor deposition (OVD) method. The porous silica glass body M has a structure in which, for example, glass fine particles having a particle diameter of 0.1 to 1 μm generated by a flame hydrolysis reaction of a silicon compound gas ($SiCl_4$, siloxane, or the like) are deposited on a predetermined target, and is generally also referred to as soot body (soot). The porous silica glass body M contains adsorbed water and moisture as a silanol group. When the moisture and the fluorine compound gas react with each other, an HF gas is generated. When the HF gas leaks out of the furnace core tube 20, the HF gas may cause corrosion of a metal component in the furnace body 14. Since vapor pressure of metal fluoride generated by the corrosion is sufficiently low and a boiling point is 1000° C. or more, an amount of the metal fluoride mixed in a product is small, but it is desirable to prevent the generation of the HF gas from the viewpoint of preventing deterioration of the furnace body 14.

Therefore, in the production method according to the present embodiment, before the fluorine addition step, the degasification step of degassing the inside of the furnace core tube 20 under reduced pressure while heating the inside of the furnace core tube 20 is performed. In the degasification step, the moisture in the porous silica glass body M is desorbed by heat.

A desorption reaction of the adsorbed water is promoted at 200° C. or more, and desorption of an OH group in the silanol group is promoted at 600° C. or more. These desorption reactions proceed faster as the temperature is higher. Therefore, the degasification step is preferably performed at 600° C. or more, and a maximum temperature is preferably 900° C. or more. When the temperature in the degasification step is less than 600° C. desorption of the moisture does not proceed sufficiently, and as a result, transmission loss when used as an optical fiber may increase. From the viewpoint of sufficiently promoting the desorption of the moisture and further preventing the transmission loss, a heating time at the maximum temperature is preferably 30 minutes or more. On the other hand, when the temperature exceeds 1200° C., the porous silica glass body M is consolidated and density thereof increases. As a result, in the fluorine addition step, the fluorine compound gas is less likely to permeate into the porous silica glass body M. Accordingly, the degasification step is preferably performed at 1200° C. or less.

The degasification step is also performed under reduced pressure to increase desorption efficiency. From the viewpoint of further improving the desorption efficiency, an ultimate pressure at an end of the degasification step is preferably less than 500 pascals, more preferably less than 200 pascals, and still more preferably less than 100 pascals.

From the viewpoint of efficiently exhausting an impurity such as the moisture desorbed in the degasification step to an outside of the furnace core tube 20 and preventing re-adhesion of the moisture or the like to the porous silica glass body M, the degasification step may be performed while supplying the inert gas into the furnace core tube 20. Here, the inert gas is not particularly limited, and a $N_2$ gas, an Ar gas, a He gas, or the like may be used. Among these gases, the $N_2$ gas is preferably used from the viewpoint of reducing a production cost. The same applies to the inert gas used in other steps.

The fluorine compound gas used in the fluorine addition step is not particularly limited, and is preferably a compound gas of a group 14 element and fluorine, and specifically, a $CF_4$ gas and a $SiF_4$ gas are preferable. These gases tend to be stable and difficult to decompose even at a high temperature. For example, the $CF_4$ gas and the $SiF_4$ gas have a single dissociation rate of 1 ppm or less even at 1500° C. in calculation. Therefore, even if the $CF_4$ gas and the $SiF_4$ gas leak out of the furnace core tube 20, the metal component in the furnace body 14 are less likely to be corroded.

$CF_4$ is more excellent than $SiF_4$ from the viewpoint of stability because $CF_4$ is less likely to react with a trace amount of water. On the other hand. $CF_4$ generates $CO_2$ as a by-product of a fluorine addition reaction to $SiO_2$. Since the generated $CO_2$ easily reacts with a carbon material constituting the furnace core tube 20 at a high temperature of 1100° C. or more, $SiF_4$ is preferable from the viewpoint of preventing deterioration of the furnace core tube 20. Although a $SF_6$ gas may be used, the $SF_6$ gas easily causes corrosion of a metal part when a $SO_x$ gas generated by reacting with $SiO_2$ becomes $H_2SO_4$, and thus the $SF_6$ gas is inferior to the $CF_4$ gas and the $SiF_4$ gas from the viewpoint of a long-term stable use.

The fluorine compound gas preferably does not contain a chlorine atom or a hydrogen atom. This is because if a gas containing the chlorine atom or the hydrogen atom leaks out of the furnace core tube 20 and reacts with the metal component in the furnace body 14, and a metal impurity desorbed from the metal component enters the furnace core tube 20, characteristics of the optical fiber obtained from the fluorine-containing silica glass as the product may be adversely affected. In particular, even if a transition metal impurity is contained at 1 ppb, the transition metal impurity significantly deteriorates a loss characteristic of the optical fiber. A representative example of an element that reacts with the metal component and may form a metal impurity having high vapor pressure is chlorine. In particular, iron III chloride ($FeCl_3$) has a boiling point on an order of 300° C. and high vapor pressure, and thus is one of components that are easily mixed into the product. Since the fluorine compound gas ($CCl_2F_2$ or the like) containing the chlorine atom is relatively easily decomposed and easily forms a $Cl_2$ gas, the corrosion in the furnace body 14 is easily generated.

As shown in PTL 3, an amount of fluorine added to the porous silica glass body M has a characteristic that is proportional to ¼ powers of partial pressure of the fluorine compound gas during the heat-treating. When the fluorine compound gas is supplied under reduced pressure, the partial pressure of the fluorine compound gas can be controlled by pressure in the furnace core tube 20, and thus an addition amount of the fluorine compound gas can be controlled even when a concentration thereof is 100%. However, depending on a structure of the furnace core tube 20, a pressure range that can be easily controlled may be different, and a mixed gas obtained by mixing the inert gas with the fluorine compound gas may be used for adjust the pressure range. In this case, for example, the fluorine compound gas is preferably diluted with the inert gas at a concentration (volume concentration) of 1% or more and less than 100% and supplied. By controlling a concentration ratio of a fluorine compound gas flow rate/an inert gas flow rate, a fluorine concentration of the mixed gas to be added to the porous silica glass body M can be adjusted to a desired concentration. Since the fluorine compound gas easily permeates into an inside of the porous silica glass body M under reduced pressure, an addition rate of the fluorine compound can be improved without considering mutual diffusion as in a case of supplying the mixed gas under normal pressure.

In the production apparatus 1, target partial pressure of the fluorine compound gas can be achieved by supplying a predetermined amount of gas into the furnace core tube 20 in a state where a valve provided in the exhaust pipe 41 is closed. In this case, since the fluorine compound gas is confined in the furnace core tube 20, a usage amount of the fluorine compound gas can be reduced.

The evacuation treatment is performed to efficiently exhaust the fluorine compound gas remaining in the furnace core tube 20, the furnace body 14, and the like and prevent adsorption of the impurity to the furnace core tube 20 and the furnace body 14. Although the evacuation treatment is preferably performed, the evacuation treatment may not be performed since the inside of the furnace core tube 20 is depressurized at a time of the fluorine addition step.

By performing the transparent vitrification step under reduced pressure, residual air bubbles in the product can be reduced even if the porous silica glass body M is large. From the viewpoint of reducing the residual air bubbles, the ultimate pressure at an end of the transparent vitrification step is preferably less than 500 pascals, more preferably less than 200 pascals, and still more preferably less than 100 pascals.

The temperature in the transparent vitrification step is not particularly limited as long as the temperature is higher than the temperatures in the degasification step and the fluorine addition step, but from the viewpoint of sufficiently consolidating the porous silica glass body M in a short time, the temperature is preferably 1250° C. or more, more preferably 1300° C. or more, and still more preferably 1320° C. or more. However, since viscosity of the glass is lowered by the addition of fluorine to the glass preform, if the temperature in the transparent vitrification step is too high, the glass preform may be stretched by an own weight thereof, and an appropriate temperature of 1400° C. or less is required to be selected. By performing the transparent vitrification step under reduced pressure, the residual air bubbles can be reduced, and when the fiber is formed in a drawing step which is a subsequent production step, a decrease in a yield due to an occurrence of diameter variation caused by the residual bubbles can be prevented. An annealing step or the like for removing the residual air bubbles is not required before the drawing step.

In the transparent vitrification step, the supply of the fluorine compound gas may be continued or stopped. When the fluorine compound gas flows, there is an advantage that an addition amount of fluorine in a porous body outer furnace core tube 20. In even-numbered steps, the temperature was increased, decreased, or maintained, and in other steps, the temperature shown in Table 1 was maintained. A "Time" shown in Table 1 is a time required for each step. "$CF_4$" and "$N_2$" shown in Table 1 respectively indicate supply amounts of the $CF_4$ gas and the $N_2$ gas in each step, and "No" indicates that a $CF_4$ gas and a $N_2$ gas were not supplied. A unit "slm" of the supply amount is an abbreviation of a flow rate per minute in a standard state (0° C., 1 atm), that is, "standard little per minute". Regarding "Exhaust" shown in Table 1, "Yes" indicates that exhaustion of the furnace core tube 20 was performed, and "No" indicates that the exhaustion of the furnace core tube 20 was not performed. In steps 5 to 7, the exhaustion was not performed, and the $CF_4$ gas was confined in the furnace core tube 20. Step 8 is the evacuation treatment.

TABLE 1

| | Step | | | | | | | | | | |
|---|---|---|---|---|---|---|---|---|---|---|---|
| | Degasification step | | | | Fluorine addition step | | | Transparent vitrification step | | | |
| | 1 | 2 | 3 | 4 | 5 | 6 | 7 | 8 | 9 | 10 | 11 |
| Temperature [° C.] | 800 | Increase | 1000~1200 | Increase | 1050~1200 | Increase, decrease, or maintained | 1050~1200 | Increase | 1270~1320 | Increase | 1330~1400 |
| Time [minute] | 1 | 55 | 60~120 | 10 | 10~40 | 1 | 240~480 | 80~120 | 50~120 | 50~100 | 10 |
| $CF_4$ [slm] | NO | NO | NO | NO | 1~5 | 0~1 | 0~1 | NO | NO | NO | NO |
| $N_2$ [slm] | NO | NO | NO | NO | NO | NO | NO | 4 | NO | NO | NO |
| Exhaust | Yes | Yes | Yes | Yes | NO | NO | NO | Yes | Yes | Yes | Yes | peripheral portion serving as a cladding portion of the optical fiber is increased, but damage to the furnace core tube 20 or the like is likely to occur.

The transparent fluorine-containing silica glass and the fluorine compound gas remaining in the furnace core tube 20 can be exhausted to an outside of a reaction system by a vacuum treatment (exhausting by the vacuum pump 47) of the furnace core tube 20, and at this time, if the ultimate pressure can be maintained at a low level, the residual air bubbles in the transparent fluorine-containing silica glass can be reduced. By exhausting the fluorine compound gas while supplying the inert gas, an adsorbed component in the reaction system can be efficiently desorbed, and the damage to the furnace core tube 20 can be prevented.

When the fluorine compound gas is not present around the porous silica glass body M during the transparent vitrification, fluorine added to an outside of the porous silica glass body M is desorbed, and a refractive index of the portion is increased. However, in an optical fiber application, even if the refractive index of the cladding outer peripheral portion is slightly increased, an influence on an optical transmission characteristic is small.

EXAMPLES

Hereinafter, the present disclosure will be described in more detail by showing Production Examples 1 to 12 as examples according to the present disclosure. The present disclosure is not limited to the following examples.

Figure 2:
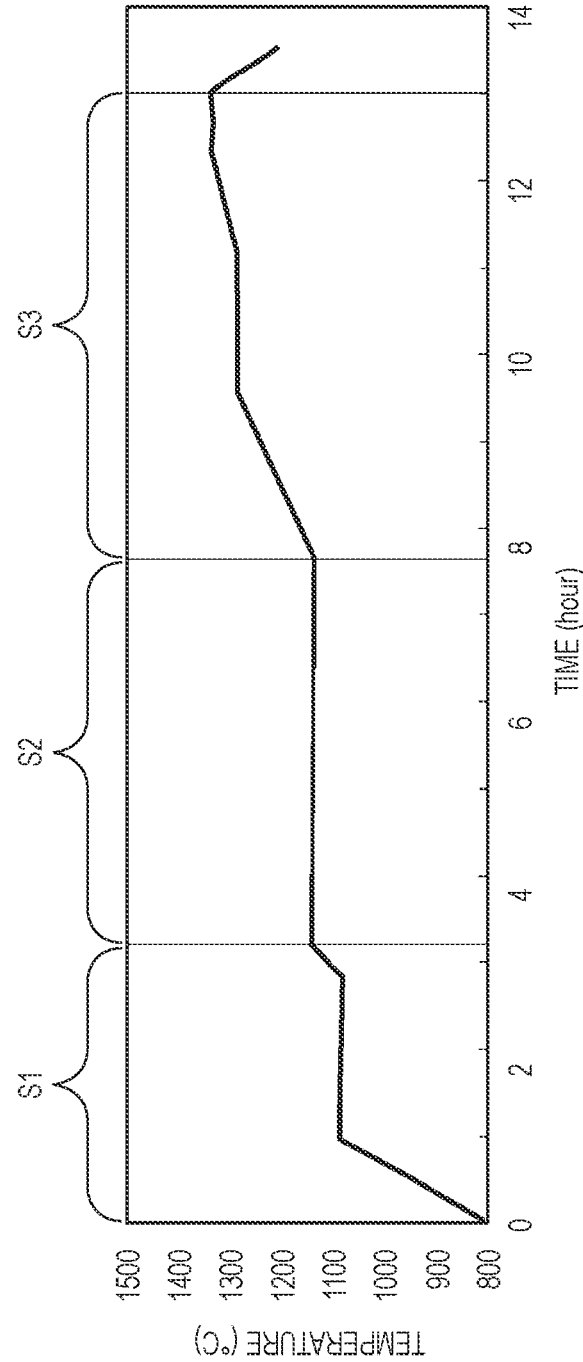
FIG. 2 is a graph showing a relationship between a time and a temperature in a production example.

Fluorine-containing silica glass in each of the production examples was produced using the production apparatus 1 under conditions shown in Table 1 below. A "Temperature" shown in Table 1 is a temperature of the surface of the FIG. 2 is a graph showing an example of a relationship between the time and the temperature shown in Table 1. FIG. 2 is specifically a graph corresponding to Production Example 1 to be described below. A degasification step S1 in FIG. 2 corresponds to steps 1 to 4 in Table 1. A fluorine addition step S2 in FIG. 2 corresponds to steps 5 to 7 in Table 1. As described above, in the fluorine addition step S2, the exhaustion is not performed. A transparent vitrification step S3 in FIG. 2 corresponds to steps 8 to 11 in Table 1.

Production Example 1

In Production Example 1, a soot body (porous silica glass body) in which a porous glass layer was deposited on a starting rod having a structure of a core portion and a cladding portion by the VAD method was used for treatment. In the conditions shown in Table 1, in step 3, the temperature was 1100° C. and the time was 120 minutes, and in step 5, the temperature was 1100° C., the time was 20 minutes, and the $CF_4$ supply amount was 5 slm. A total supply amount of $CF_4$ was 100 liters. Steps 6 and 7 were performed at the same temperature as step 5, and a treatment time of step 7 was 240 minutes. The supply amount of $CF_4$ in steps 6 and 7 was 0 slm. A temperature increasing time in step 8 was 100 minutes, a maintaining time in step 9 was 70 minutes at 1300° C., the temperature increasing time in step 10 was 90 minutes, the temperature in step 11 was 1350° C., and the soot body was made transparent to produce the transparent silica glass.

Figure 3:
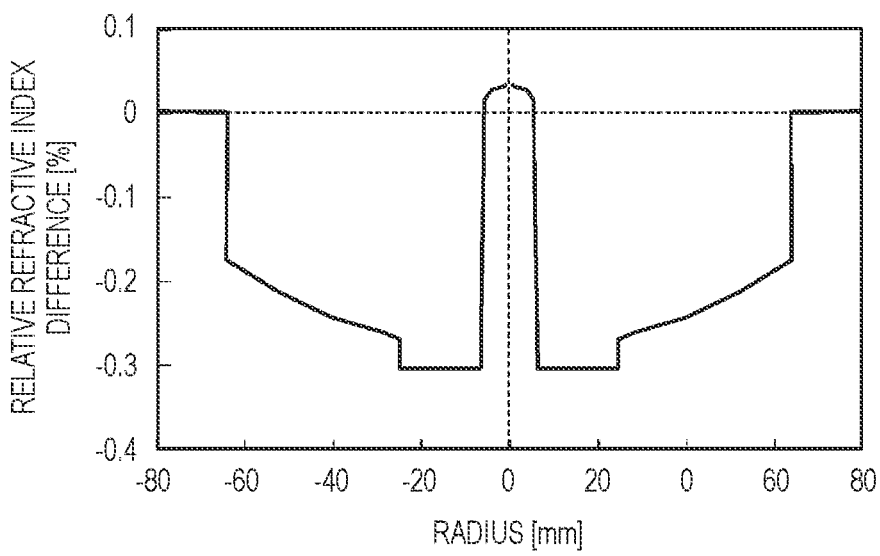
FIG. 3 is a graph showing relative refractive index difference distribution in a radial direction of fluorine-containing silica glass produced in Production Example 1.

A relative refractive index difference of the transparent silica glass produced in Production Example 1 is shown in FIG. 3. In FIG. 3, a portion having a radius of up to ±25 mm corresponds to a portion of the starting rod, and a region having a radius of ±25 mm to 65 mm corresponds to a portion of the fluorine-added silica glass produced in the present production example. An addition amount of fluorine was 0.26% in an inside and 0.18% in an outer peripheral portion in terms of a refractive index difference, and the addition amount and refractive index distribution were not problematic in terms of a characteristic for an optical fiber preform.

Production Examples 2 to 4

Figure 4:
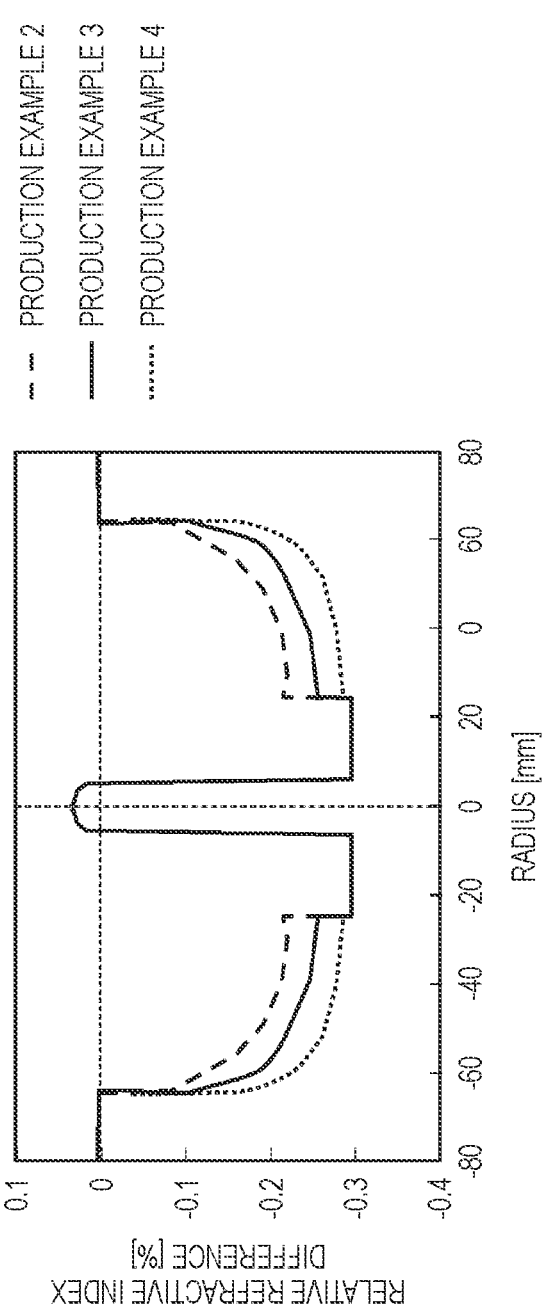
FIG. 4 is a graph showing relative refractive index difference distribution in radial directions of fluorine-containing silica glass produced in Production Examples 2 to 4.

As in Production Example 1, a soot body in which a porous glass layer was deposited on a starting rod having a structure of a core portion and a cladding portion by the VAD method was used for treatment. In Production Examples 2 to 4, a supply amount of $CF_4$ in step 5 was 5 slm, and required times were 15 minutes, 30 minutes, and 45 minutes, respectively. Otherwise, the transparent silica glass of Production Examples 2 to 4 was produced in the same manner as in Production Example 1 except that the time of step 7 was 480 minutes. Relative refractive index differences of the transparent silica glass of Production Examples 2 to 4 are shown in FIG. 4. As shown in FIG. 4, an addition amount of fluorine can be adjusted by changing a total amount of the supplied gas. By extending a treatment time of step 5, a decrease in an amount of fluorine added to an outer peripheral portion can be prevented as compared with Production Example 1 shown in FIG. 3.

Production Examples 5 to 7

Figure 5:
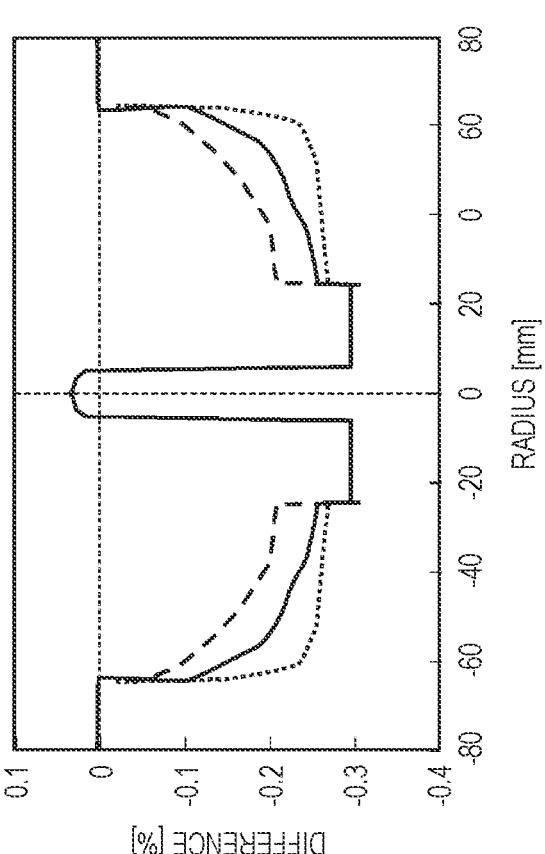
FIG. 5 is a graph showing relative refractive index difference distribution in radial directions of fluorine-containing silica glass produced in Production Examples 5 to 7.

As in Production Example 1, a soot body in which a porous glass layer was deposited on a starting rod having a structure of a core portion and a cladding portion by the VAD method was used for treatment. In step 5, a supply amount of $CF_4$ was 5 slm, and a required time was 45 minutes. In Production Examples 5 to 7, set temperatures in steps 5 to 7 were changed at three levels of 1050° C. 1100° C., and 1150° C., and other conditions were the same as those in Production Examples 2 to 4. Relative refractive index differences of the transparent silica glass of Production Examples 5 to 7 are shown in FIG. 5. As shown in FIG. 5, an addition amount of fluorine can be adjusted by changing temperatures in the fluorine addition step.

Production Example 8

Figure 6:
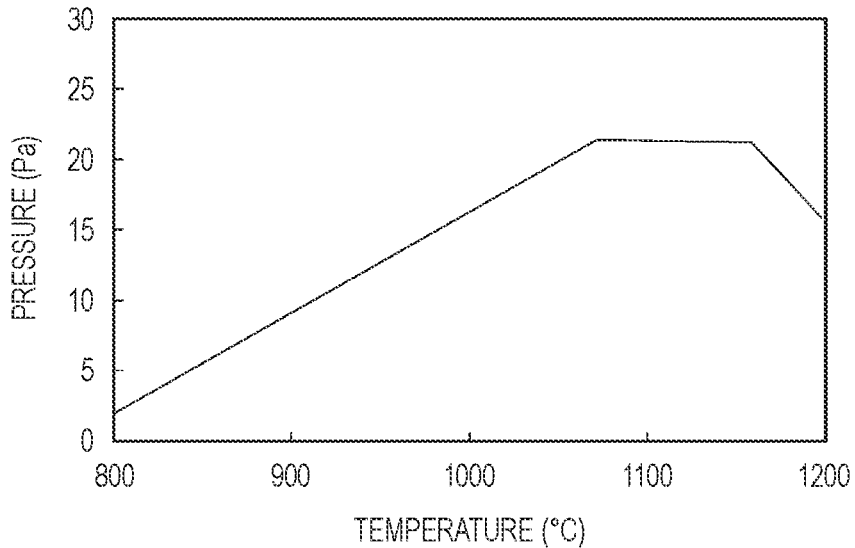
FIG. 6 is a graph showing a relationship between a temperature and pressure when the temperature is increased in a degasification step.

In Production Example 8, conditions in a degasification step were adjusted. In Production Example 8, the same conditions as in Production Example 1 were used except that the temperature in step 3 in Table 1 was 1200° C. A change in furnace internal pressure when a temperature is increased is shown in FIG. 6. From FIG. 6, it is observed that the furnace internal pressure increases as the temperature increases, but tends to become constant near 1100° C. and decrease at 1150° C. or more. This indicates that although the furnace internal pressure is increased by $H_2O$ desorbed from a soot body, moisture of the soot body is reduced by maintaining a furnace at a high temperature, and the moisture does not contribute to a pressure increase.

Figure 7:
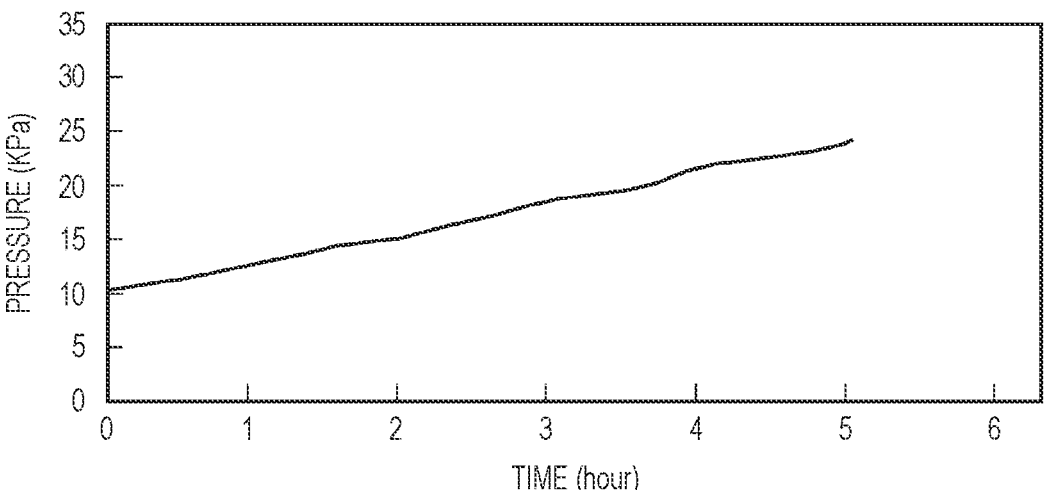
FIG. 7 is a graph showing a temporal change in pressure in a fluorine addition step in Production Example 8.

Next, a pressure change in a fluorine addition step is shown in FIG. 7. Pressure when $CF_4$ was introduced into a 100-liter furnace in total was about 10 KPa, increased with a lapse of a treatment time, and increased to 21 KPa after a lapse of 240 minutes. This is a reaction between $CF_4$ and $SiO_2$, and a reaction of forming $SiF_4$ and $CO_2$, and a reaction of $CO_2$ and carbon in a furnace core tube to form a CO gas appear in a complex manner.

In a condition change in a current degasification step, refractive index distribution was substantially the same as that shown in FIG. 3, and an influence on an addition amount of fluorine by increasing a temperature in the degasification step was hardly observed.

Production Examples 9 to 11

Figure 8:
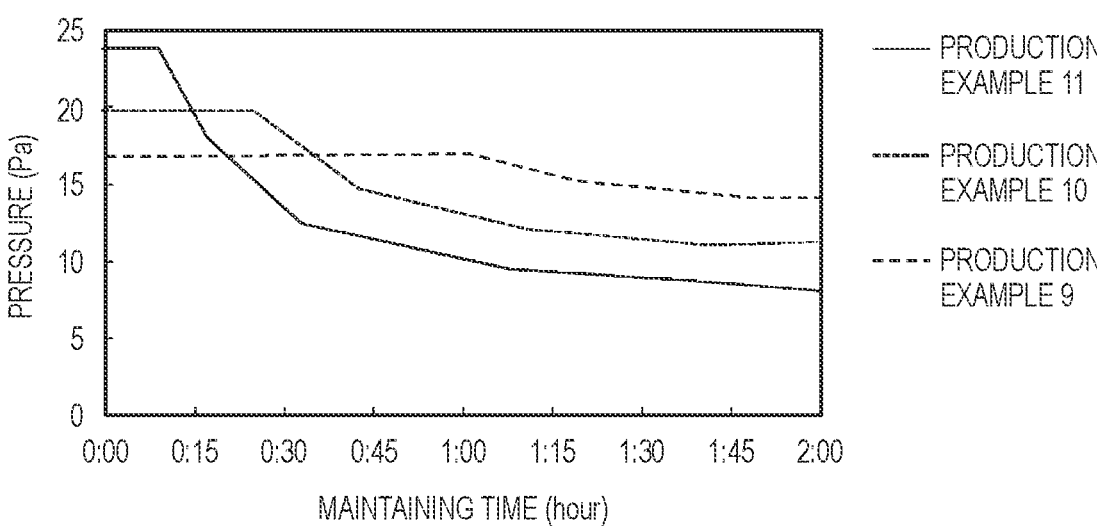
FIG. 8 is a graph showing pressure changes when a constant temperature is maintained in degasification steps in Production Examples 9 to 11.

In Production Examples 9 to 11, the same conditions as in Production Example 1 were used except that the temperatures in step 3 in Table 1 were 1000° C. 1050° C., and 1100° C., respectively. FIG. 8 shows changes in furnace internal pressure when a temperature is maintained after the temperature is increased. From FIG. 8, the furnace internal pressure is maintained at constant pressure at a beginning of a maintaining time, and then starts to decrease. It can be seen that the higher the temperature, the shorter a time during which the constant pressure is maintained, and the lower an ultimate pressure when the constant pressure is maintained for 2 hours. This indicates that an amount of an increase in the furnace internal pressure due to $H_2O$ desorbed from a soot body increases as the temperature increases, and a time taken to reduce moisture of the soot body can be shortened.

Even under a condition change in a current degasification step, refractive index distribution was substantially the same as that shown in FIG. 3, and an influence on an addition amount of fluorine by changing the temperature in the degasification step was hardly observed. However, in a treatment at 1000° C., it is estimated that a $SiO_2$ powder adheres to a part of a front chamber after a preform is produced, and an influence of residual $H_2O$ occurs.

Production Example 12

Figure 9:
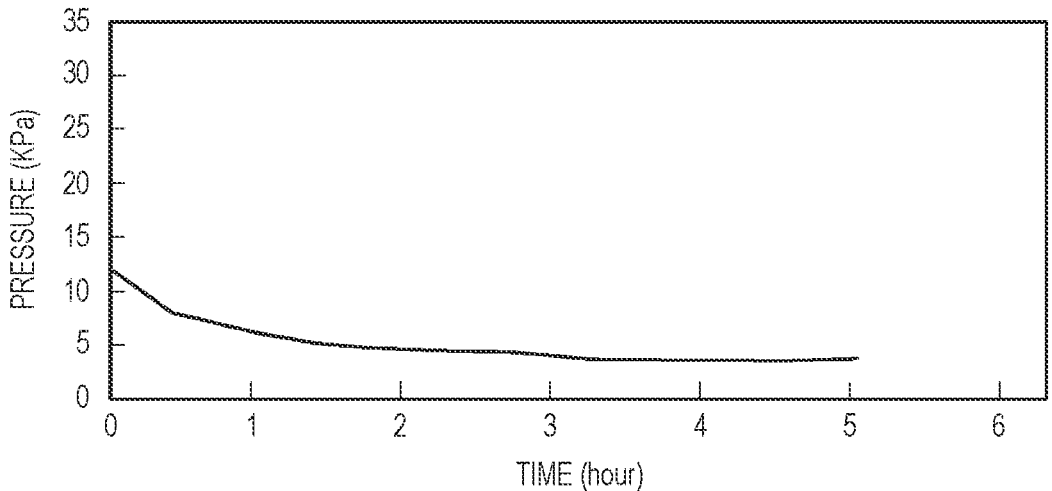
FIG. 9 is a graph showing a temporal change in pressure in a fluorine addition step in Production Example 12.

Transparent silica glass of Production Example 12 was produced in the same manner as in Production Example 1 except that the conditions shown in Table 1 were changed to conditions shown in the following Table 2. In Production Example 12, a fluorine compound gas is $SiF_4$. FIG. 9 shows a pressure change in a fluorine addition step. Pressure when $SiF_4$ was introduced into a 100-liter furnace in total was about 10 KPa, decreased with a lapse of a treatment time, and an ultimate pressure was about 4 KPa. This corresponds to a fact that since fluorine is added to a soot body in a reaction of $SiF_4$ and $SiO_2$, $SiF_4$ is consumed, gas molecules in a furnace decrease, and pressure decreases. Obtained refractive index distribution was substantially the same as that shown in FIG. 3, and an influence of a fluorine compound change on an addition amount of fluorine was hardly observed.

TABLE 2

| | Step | | | | | | | | | | |
|---|---|---|---|---|---|---|---|---|---|---|---|
| | Degasification step | | | | Fluorine addition step | | | Transparent vitrification step | | | |
| | 1 | 2 | 3 | 4 | 5 | 6 | 7 | 8 | 9 | 10 | 11 |
| Temperature [° C.] | 800 | Increase | 1150 | Decrease | 1100 | Maintained | 1100 | Increase | 1300 | Increase | 1350 |
| Time [minute] | 0 | 55 | 120 | 10 | 20 | 1 | 240 | 100 | 70 | 90 | 10 |
| Sif$_4$ [slm] | NO | NO | NO | NO | 5 | 0 | 0 | NO | NO | NO | NO |
| N$_2$ [slm] | NO | NO | NO | NO | NO | NO | NO | 4 | NO | NO | NO |
| Exhaust | Yes | Yes | Yes | Yes | NO | NO | NO | Yes | Yes | Yes | Yes |

As shown in FIGS. 3 to 9, all of the transparent silica glass obtained in Production Examples 1 to 12 contained sufficient fluorine in cladding portions.

Although the present invention is described in detail with reference to the specific embodiment, it will be apparent to those skilled in the art that various changes and modifications can be made without departing from the spirit and scope of the present invention. The numbers, positions, shapes, and the like of components described above are not limited to the embodiment described above and can be changed to suitable numbers, positions, shapes, and the like on a premise that the present invention is achieved.

REFERENCE SIGNS LIST

1: production apparatus
10: container
11: front chamber
12: rod
13: gate valve
14: furnace body
15: heater
16: heat insulating material
20: furnace core tube
31: furnace core tube gas supply portion
32: furnace body gas supply portion
41: furnace core tube exhaust pipe
42: furnace core tube exhaust valve
43: furnace body exhaust pipe
44: furnace body exhaust valve
45: front chamber exhaust pipe
46: front chamber exhaust valve
47: vacuum pump
48: exhaust valve
S1: degasification step
S2: fluorine addition step
S3: transparent vitrification step
M: porous silica glass body

The invention claimed is:

1. A method for producing fluorine-containing silica glass, comprising:

decompression degassing which includes degassing an inside of a furnace core tube under reduced pressure while heating the inside of the furnace core tube, after inserting a porous silica glass body into the furnace core tube provided in an airtight container;

fluorine adding which includes supplying a fluorine compound gas into the furnace core tube, exhausting the fluorine compound gas remaining in the furnace core tube to an outside of the furnace core tube, and first heat-treating the porous silica glass body, under reduced pressure; and second heat-treating the porous silica glass body under reduced pressure at a temperature higher than temperatures in the decompression degassing process and the fluorine adding process, wherein the decompression degassing, the fluorine adding, and the second heat-treating are performed within the same furnace core tube, in the fluorine adding, the first heat-treating is performed after stopping exhaustion of the furnace core tube, the decompression degassing process is performed at a temperature of 1100° C. or more and 1200° C. or less, the decompression degassing process has a heating time of at least 30 minutes at the temperature, and an ultimate pressure at an end of the decompression degassing process is less than 500 pascals.

2. The production method according to claim 1, wherein in the decompression degassing process, an inert gas is supplied into the furnace core tube.

3. The production method according to claim 1, wherein the fluorine compound gas used in the fluorine adding process is a compound gas of a group 14 element and fluorine, and does not contain a chlorine atom or a hydrogen atom.

4. The production method according to claim 1, wherein in the fluorine adding process, the fluorine compound gas is diluted with an inert gas at a concentration of 1% or more and less than 100% and supplied, or the fluorine compound gas is supplied at a concentration of 100%.

5. The production method according to claim 1, wherein in the second heat-treating process, an evacuation treatment is performed in which pressure is reduced while supplying an inert gas into the furnace core tube.

6. The production method according to claim 1, wherein an ultimate pressure is less than 500 pascals at an end of the second heat-treating process.

* * * * *